United States Patent [19]

Ballendux et al.

[11] 4,119,119

[45] Oct. 10, 1978

[54] SHIFT CONTROL DETENT MECHANISM

[75] Inventors: Gerardus M. Ballendux, Waukesha; Ferdynand Kolacz, New Berlin, both of Wis.

[73] Assignee: Allis-Chalmers Corporation, Milwaukee, Wis.

[21] Appl. No.: 752,560

[22] Filed: Dec. 20, 1976

[51] Int. Cl.² ...................... F16K 31/524; G05G 5/24
[52] U.S. Cl. ........................................ 137/868; 74/475; 74/540; 251/231; 251/251; 251/297
[58] Field of Search ................. 74/475, 540; 251/231, 251/251, 297; 137/609, 630.2, 868

[56] References Cited

U.S. PATENT DOCUMENTS

| 203,494 | 5/1878 | Perkins | 137/630.2 |
| 2,943,501 | 7/1960 | Stapleton | 74/475 X |
| 3,106,198 | 10/1963 | Hansen | 74/475 X |
| 3,177,737 | 4/1965 | Williams et al. | 74/540 X |
| 3,913,621 | 10/1975 | Damratowski | 251/251 X |

*Primary Examiner*—Allan D. Herrmann
*Attorney, Agent, or Firm*—Arthur L. Nelson

[57] ABSTRACT

A shift control mechanism having a detent means for selectively positioning the shifting mechanism for selective and alternative engagement of hydraulic actuators in a power shift transmission through spool valves operated by a control rack connected to the shifting mechanism.

10 Claims, 6 Drawing Figures

SHIFT CONTROL DETENT MECHANISM

This invention relates to a transmission and more particularly to a detent mechanism for selectively positioning the shift mechanism and control rack for selection in alternative positions for operating a power shift transmission in a pre-selected number of gear ratios.

Power shift transmissions operate to selectively engage clutches in the transmission through hydraulic actuators operated by pressurized fluid from a hydraulic pump. The hydraulic actuator in each of the clutches engages the clutch when pressurized fluid is supplied to the hydraulic actuator. One or a plurality of hydraulic actuators are engaged through valves in the power shift transmission control unit to selectively engage clutches providing a plurality of power paths through the transmission. The shift lever normally pivots through a sequence of positions to provide actuation and de-actuation of the hydraulic actuators through the spool valves which are operated by cammed surfaces on the control rack. A detent mechanism must be provided to retain the control rack and shift lever in the shifted position to provide drive through the transmission for the vehicle once the speed range is selected by the operator. The detent means must operate without interference when shifting the transmission and yet retain the control rack and the spool valves in the operating position once the speed ratio is selected by the operator. Accordingly, this invention provides a detent mechanism which is connected to the transmission shifting mechanism and provides a plurality of detent positions correlated to the control rack positions for operating the selected spool valves for the desired speed ratio in the transmission.

Accordingly, it is an object of this invention to provide a detent mechanism for a power shift transmission.

It is another object of this invention to provide a detent mechanism for a control rack on a power shift transmission to selectively position and retain the control rack position in the desired speed ratio of the transmission.

It is a further object of this invention to provide a detent mechanism for a power shift transmission for selectively positioning the control rack in a transmission in any one of the selected of plurality of speed ratios of the transmission as selected by the operator of the vehicle.

The objects of this invention are provided with a transmission shift control for a power shift transmission. The shifting mechanism operates a control rack having cam surfaces for operating a plurality of spool valves to selectively and alternatively operate hydraulic actuators in the power shift transmission. A detent mechanism in combination with the shift transmission selectively retains the shift mechanism in the selected gear ratio position of the transmission. The detent mechanism includes cam surfaces and a cam follower whereby the detent segment can be selectively retained in a sequence of the plurality of positions which coincide with positions of the control rack for operating spool valves in the transmission. The detent mechanism operates in conjunction with the shift mechanism retaining the shift mechanism and the control rack in the selected position as controlled by the operator of the vehicle.

Referring to the drawings, the preferred embodiment of this invention is illustrated.

Figure 1:
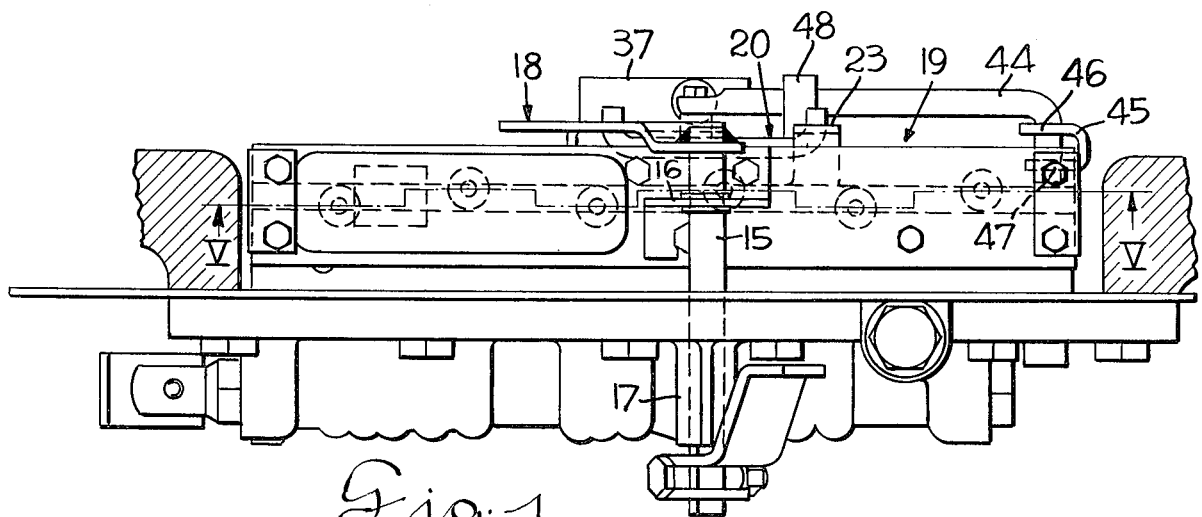
FIG. 1 illustrates a plan view of the power shift transmission control valve.
Figure 5:
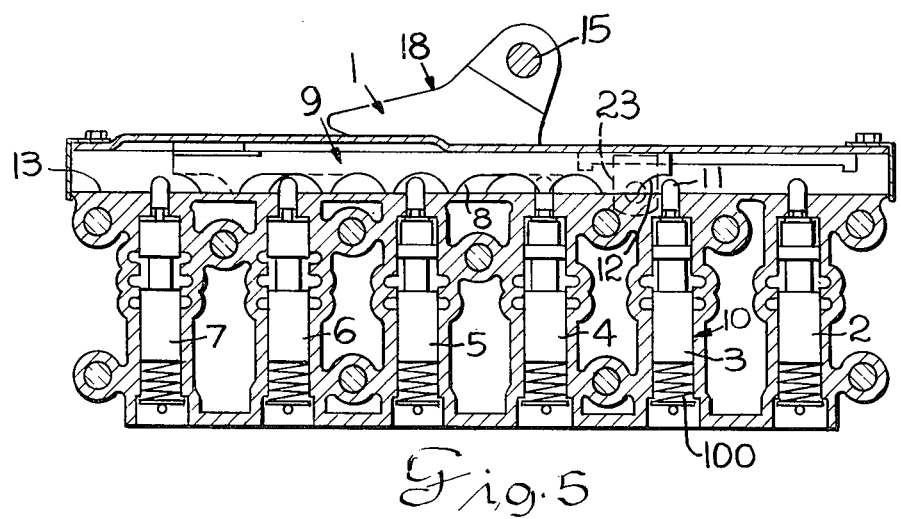
FIG. 5 illustrates a cross section view taken on line V—V of FIG. 1.

Referring to FIG. 5, the power shift transmission control valve 1 includes a plurality of spool valves 2, 3, 4, 5, 6 and 7. Each of the spool valves controls the flow of pressurized fluid from the pump through the control valve to a hydraulic actuator in the power shift transmission. The spool valves are depressed by the cammed surfaces on the underside 8 of the control rack 9. Each of the spools are essentially the same as spool 10 which is formed with a stem 11 which engages a cam surface 12 on the control rack 9. As the control rack 9 is reciprocated within the opening 13 in the control valve, selective spools are depressed or released depending on the cammed surfaces in the control valve. Spring 100 biases the spool 3 to its return position. It is noted that the spools are staggered in the control valve as indicated in FIG. 1 to accommodate the double cammed surfaces on the control rack.

Figure 2:
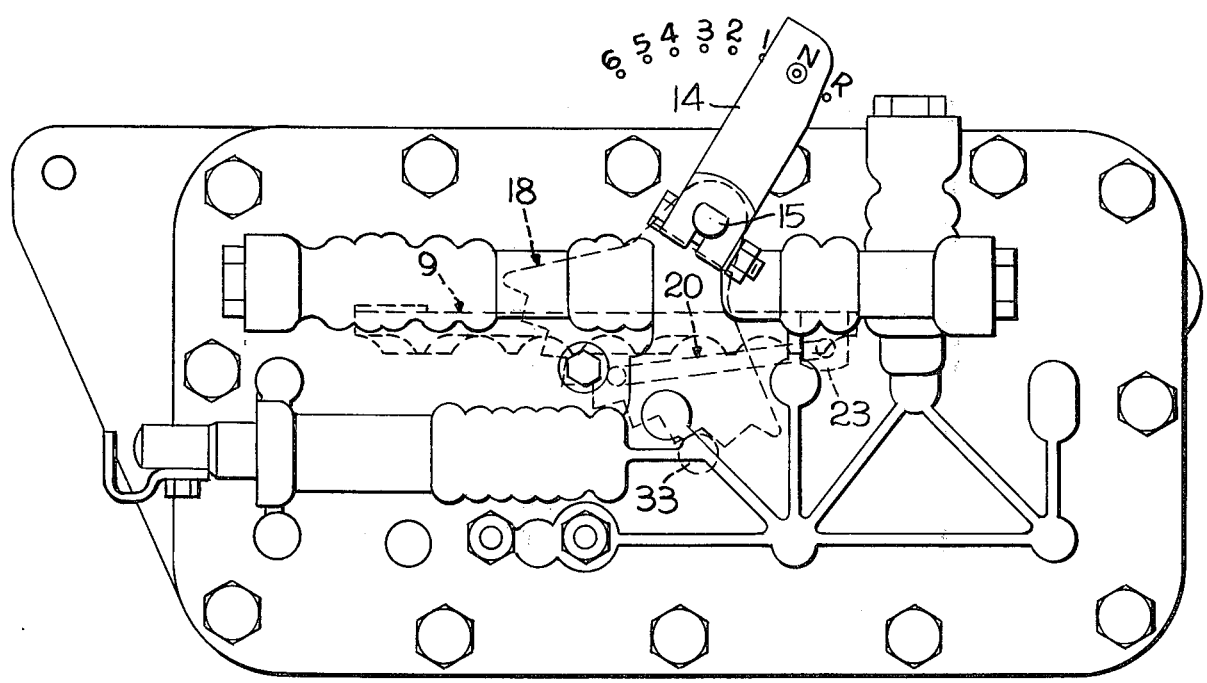
FIG. 2 illustrates a side elevation view of the power shift transmission control valve.

The shift lever 14 is pivotally mounted on a shaft 15. The shaft 15 is mounted in the bearings 16 and 17 on the housing of the valve 1. The shaft 15 is integral with the shift lever 14 and the detent segment 18. The housing 19 pivotally supports the shift lever and the detent segments for pivotal rotation to the selective positions as shown in FIG. 2 which provides six forward speeds, a neutral and a reverse.

Figure 6:
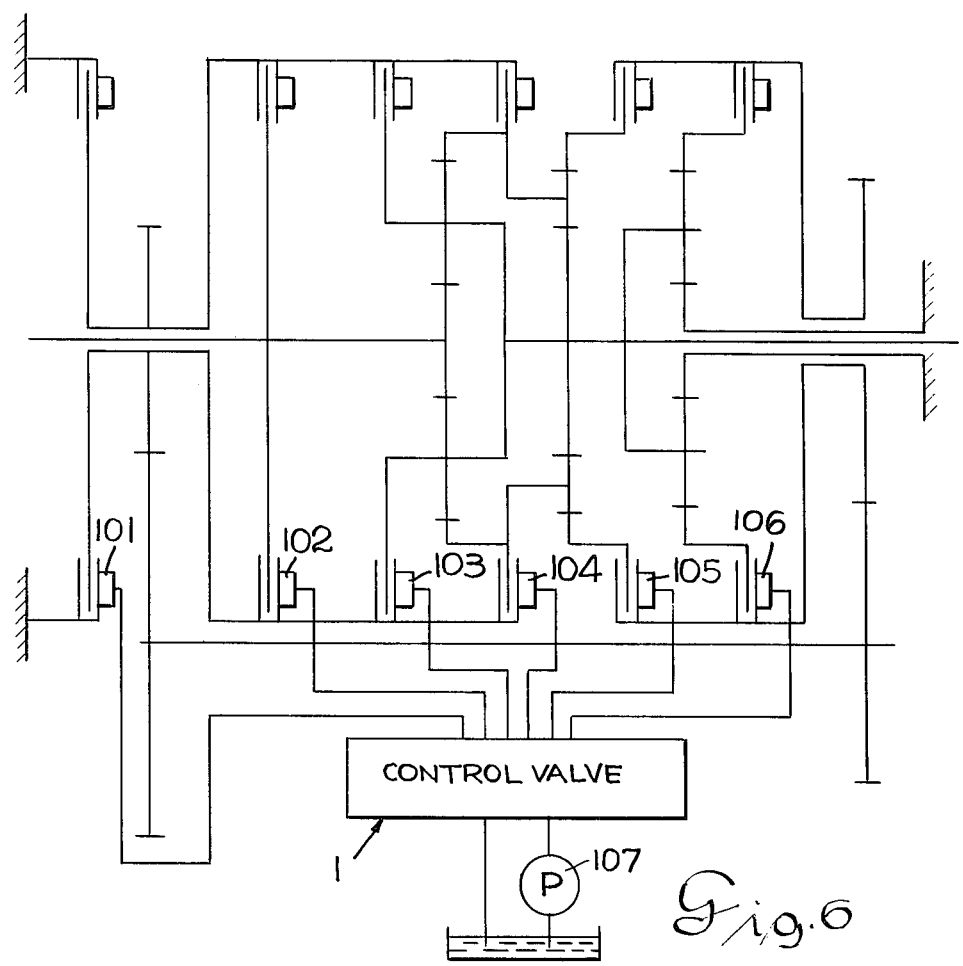
FIG. 6 is a schematic diagram of a power shift transmission and the control valve.

A separate diagram is shown in FIG. 6 with the spool valves connected for rotation of the power shift transmission which includes the clutches 101, 102, 103, 104 and 105 as shown connected to the control valve 1. The shift lever 14 is normally connected through a suitable linkage to a control lever at the operator station on the vehicle. The shift lever 14 is operated by angular rotation on the shaft 15 to selectively operate the spool valves for shifting of the transmission. The cammed surfaces on the underside of the control rack 9 is correlated to the position shown for the shift lever 14. Similarly, the shift lever 14 is connected to the detent segment 18. The detent mechanism is more clearly shown in FIGS. 1, 2, 3 and 5 in which the shaft 15 extends through to the detent segment 18 from shift lever 14. Detent segment 18 operates the control rack 9 through the link 20. The link 20 is pivotally connected by the end 21 extending through the detent segment 18 which receives the cotter pin 22. The opposite end of the link 20 extends through the tab 23 on the control rack 9 and receives the cotter pin 24. Accordingly, the rotational movement of the detent segment 18 transmits through the link 20 a reciprocal movement to the control rack 9. The detent segment 18 is formed by the plurality of cam slots 25, 26, 27, 28, 29, 30, 31 and 32. Each of the cam slots selectively receives the roller 33 as it is biased into the cam slot by the spring 36. The roller 33 retains the detent segment 18 in the selected position which correlates with the six forward speeds, neutral and reverse as shown in FIG. 2. Accordingly, the detent mechanism retains the shift lever 14 and the control rack in the correlated position, the transmission is shifted into one of the speed ratios as indicated in FIG. 2.

The detent mechanism also includes the plunger 35 which extends downwardly within the coil spring 36 which is seated on the flange 37. The flange 37 is integral with the bracket 38 which is mounted on the valve housing by the bolts 39 and 40. The upper end of the coil spring 36 engages the spring seat 41 mounted on the roller mount 42. The roller mount 42 carries the bolt 43 which rotatably supports the roller 33.

The detent arm 44 is pivotally supported in the bracket 45 which forms a double bearing 46 and 47 maintaining the vertical pivotal movement of the detent arm 44. The detent arm 44, however, is also guided in its movement by the guide 48 extending upwardly as an integral part of the bracket 38. The guide 48 extends around the detent arm 44 upwardly and over the detent arm to limit its movement in both the upper and lower limit.

The power shift control valve shown in FIG. 6 controls the operation of the power shift transmission. Reference may be had to a more detailed illustration and description of the control valve in the power shift transmission in co-pending applications of Ernest A. Kreitzberg, Valve Assembly for Power Shift Transmission, Ser. No. 710,907 and Power Shift Transmission with Replaceable Control Unit, Ser. No. 711,106. These applications are of the same assignee as this application and are available for reference for a more complete description of the control valve as well as the power shift transmission and their operation in general.

Figure 3:
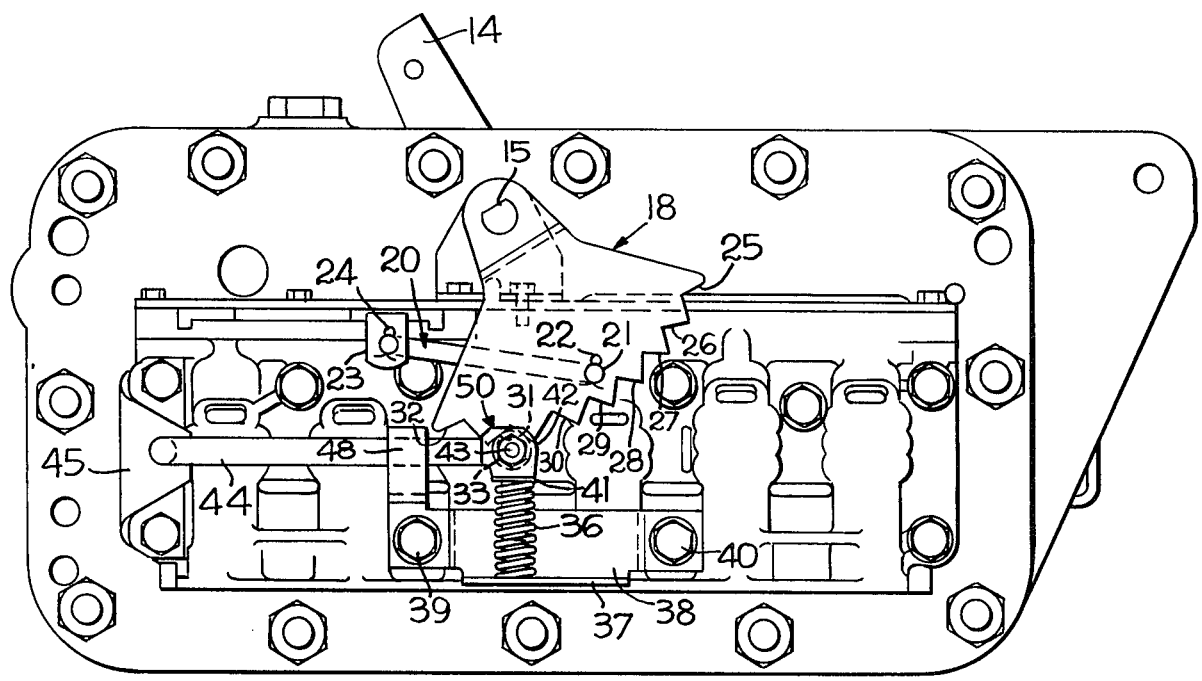
FIG. 3 illustrates a side elevation view of the power shift transmission control valve viewed from the opposite side showing the detent mechanism.
Figure 4:
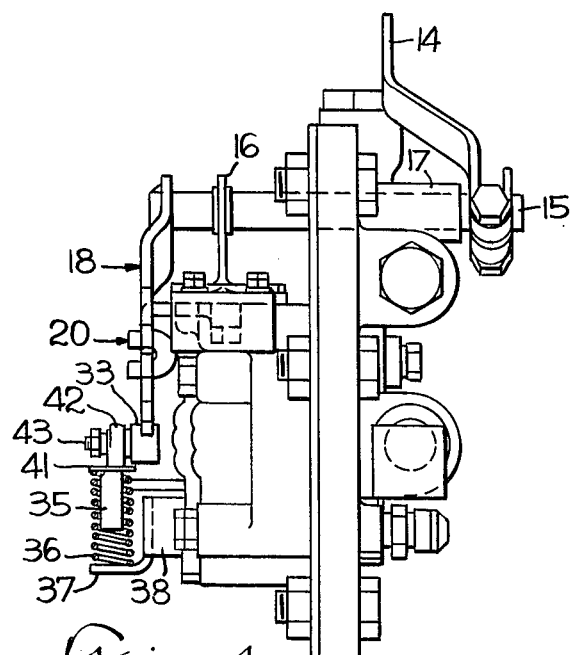
FIG. 4 is an end view of the power shift transmission control valve showing the detent mechanism on the left side and the shift control lever on the right side.

The operation of the shift control detent mechanism of this application will be described subsequently. The shift lever 14 shifts the control valve and the power shift transmission. The shift lever 14 is shown with six forward speed positions, a neutral and a reverse. The shift lever is normally operated from the operator station through a control lever and a linkage which shifts the lever through the sequence of speed ratios as indicated. As the shift lever is moved through the sequence of positions, the detent segment 18 is also moved through a corresponding sequence of positions as shown in FIG. 3. With the movement of the detent segment 18, the control rack 9 also moves through a corresponding sequence of positions which selectively depress and release spool valves which controls the flow of pressurized fluid from the pump 107 through the control valve in the hydraulic system to pressurize hydraulic actuators in the selective clutches operated. Accordingly, the transmission goes through the sequences of speed ratios and positions as shown for the transmission shift control lever 14. The detent mechanism serves as a means for retaining the transmission and control valve in the speed ratio desired by the operator once the speed ratio is selected through the shift lever 14. The detent mechanism includes the roller 33 of follower 50 which is biased in an upward position in a manner so that the roller 33 seats in one of the cam slots as indicated. Once the roller of the cam follower seats in the cam slot, the shift mechanism is retained in this position. In order to shift to another position, the shift lever must be moved forcing the roller out of the cam slot into the next cam slot in which the shift mechanism is again retained until the operator shifts to another position. The spring force of spring 36 is sufficient to retain the shift mechanism in the selected position once the shift lever is shifted until the operator moves the shift lever. Movement of the shift lever does not require an excessive force, however, the detent mechanism is adequate to hold the shift lever and the transmission in the speed ratio once it is shifted to this position. A sufficient mechanical advantage is provided in the shifting linkage from the operator station to provide the operator a means of controlling the shift lever in shifting the transmission.

The embodiments of the invention in which an exclusive property or privilege is claimed are defined as follows:

1. A power shift transmission control valve including a detent and shift mechanism for operating a power shift transmission comprising, a power shift transmission control valve, a shift lever pivotally mounted on said control valve, a detent segment integrally connected to said shift lever, a plurality of flow control valves reciprocally mounted in said control valve each biased to a return position, a control rack slidably mounted in said transmission control valve and defining a cammed surface of a predetermined number of valve operating positions for selectively operating said plurality of flow control valves, said detent segment defining said predetermined number of cam slots along a cam surface correlated with said valve positions, link means pivotally connecting said detent segment to said control rack for correlating said control rack with said detent segment, a detent follower selectively engaging said cam slots as said detent segment is operated by said shift lever, resilient means biasing said follower in an engaging position with said detent segment to retain said detent and shift mechanism in selective and alternative positions of said power shift transmission control valve.

2. A power shift transmission control valve including a detent and shift mechanism for operating a power shift transmission as set forth in claim 1 wherein said follower includes a roller for selectively engaging said cam slots on said detent segment.

3. A power shift transmission control valve including a detent and shift mechanism for operating a power shift transmission as set forth in claim 1 wherein said detent segment defines angular spaced adjoining surfaces defining said cam slots, said follower includes a roller for selectively engaging said cam slots.

4. A power shift transmission control valve including a detent and shift mechanism for operating a power shift transmission as set forth in claim 1 including means confining said control rack to a reciprocal movement, a shaft connecting said shift lever and said detent segment to provide rotary motion of said detent segment, said link means defines a connecting link connected to said detent segment and to said control rack.

5. A power shift transmission control valve including a detent and shift mechanism for operating a power shift transmission as set forth in claim 1 wherein said flow control valves define spool valves, said control rack defines cammed surfaces for selectively and alternatively engaging said spool valves thereby depressing and releasing said spool valves.

6. A power shift transmission control valve including a detent and shift mechanism for operating a power shift transmission as set forth in claim 1 wherein said follower defines a plunger, a spring encircling said plunger and biasing said follower to an engaging position with said detent segment.

7. A power shift transmission control valve including a detent and shift mechanism for operating a power shift transmission as set forth in claim 1 wherein said detent segment defines an arcuate base circle for the cammed surface defining said cam slots.

8. A power shift transmission control valve including a detent and shift mechanism for operating a power shift transmission as set forth in claim 1 wherein said control rack defines valve actuating cammed surfaces for operating said plurality of flow control valves at predetermined locations on said rack, said shift lever defining predetermined shift positions, said detent segment defining cam slots correlated to positions on said control rack and said shift lever.

9. A power shift transmission control valve including a detent and shift mechanism for operating a power shift transmission as set forth in claim 1 including a shaft integrally connecting said shift lever with said detent segment, means defining a bearing pivotally supporting said lever and segment, said control rack defining a plurality of cammed surfaces each correlating with the position of the cam slots on said detent segment to define the shift positions on said flow control valves for operating said transmission to provide a plurality of forward speeds, a neutral and reverse position for said shift lever.

10. A power shift transmission control valve including a detent and shift mechanism for operating a power shift transmission as set forth in claim 1 including means guiding said follower through a pivotal movement.

* * * * *